United States Patent
Ratnala et al.

(10) Patent No.: US 8,312,515 B2
(45) Date of Patent: Nov. 13, 2012

(54) METHOD OF ROLE CREATION

(75) Inventors: Kiran Kumar Satya Srinivasa Ratnala, Karnataka (IN); Shankar Raman, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1002 days.

(21) Appl. No.: 12/334,548

(22) Filed: Dec. 15, 2008

(65) Prior Publication Data

US 2010/0115577 A1  May 6, 2010

(30) Foreign Application Priority Data

Oct. 30, 2008  (IN) .......................... 2647/CHE/2008

(51) Int. Cl.
*G06F 21/00* (2006.01)
(52) U.S. Cl. ................. 726/4; 726/17; 726/21; 713/166
(58) Field of Classification Search ............ 726/4, 8–10, 726/17, 21, 28; 713/166, 167
See application file for complete search history.

(56) References Cited

U.S. PATENT DOCUMENTS

| | | | |
|---|---|---|---|
| 2005/0138419 A1 | 6/2005 | Gupta et al. | |
| 2005/0204146 A1* | 9/2005 | Kebinger et al. | 713/182 |
| 2008/0168063 A1* | 7/2008 | Whitson | 707/9 |
| 2008/0289036 A1* | 11/2008 | Kandasamy et al. | 726/21 |
| 2009/0157570 A1* | 6/2009 | Pall et al. | 706/11 |
| 2009/0313677 A1* | 12/2009 | Vidya et al. | 726/2 |

OTHER PUBLICATIONS

Kuhlmann et al; Role Mining—Revealing Business Roles for Security Administration using Data Mining Technology; SACMAT'03, Jun. 1-4, 2003, Como, Italy. Copyright 2003 ACM 1-58113-681-1/03/0006; pp. 179-186.

* cited by examiner

*Primary Examiner* — Gilberto Barron, Jr.
*Assistant Examiner* — Virginia T Ho (57) ABSTRACT

A method and a computer program product for creating roles in an enterprise system comprising monitoring a system for instances of a change from a first normal user to a first super user; mapping said first user with a terminal; scanning said system to derive a plurality of commands executed from said terminal; mapping at least one of the plurality of command executed from said terminal to said first super user; and creating a first role comprising an authorization to execute the at least one command executed by said first super user.

15 Claims, 4 Drawing Sheets

METHOD OF ROLE CREATION

RELATED APPLICATIONS

Benefit is claimed under 35 U.S.C. 119(a)-(d) to Foreign application Serial No. 2647/CHE/2008 entitled "METHOD OF ROLE CREATION" by Hewlett-Packard Development Company, L.P., filed on 30 Oct. 2008, which is herein incorporated in its entirety by reference for all purposes.

BACKGROUND OF THE INVENTION

Many companies are now using role based access control (RBAC) to define and assign the access rights of the employees in the company's network. In RBAC the access rights are not assigned individually for each employee, but the access rights are based on a role that an employee plays within the enterprise. The role of an employee within a company is characterized by the job and/or the function he or she should perform in the organization. From an organizational point of view, these roles are independent of particular IT-systems and correspond to a predefined position or consist of one and/or more functions. Thus, the role structure can be derived from functional and organizational properties of the company.

With RBAC, access decisions are based on the roles that individual users have as part of an organization. Users take on assigned roles (such as engineer, manager, and human resources (HR) personnel). Access rights are grouped by role name, and the use of resources is restricted to individuals authorized to assume the associated role. For example, an HR employee may require full access to personnel records from which engineers should be restricted to preserve privacy, and engineers may require full access to technical design or product data from which HR employees should be restricted to preserve secrecy, while engineering managers require limited access to both types of data. Rather than set up (and maintain) each individual employee's access controls to the personnel and technical data, under RBAC, three roles may be defined: HR, engineer, and manager. All individuals in the organization who perform the associated role are grouped together, and access controls are assigned and maintained on a per-group basis.

The use of roles to control access can be an effective means for developing and enforcing enterprise-specific security policies, and for streamlining the security management process. User membership into roles can be revoked easily and new memberships established as job assignments dictate. New roles and their concomitant access privileges can be established when new operations are instituted, and old roles can be deleted as organizational functions change and evolve.

The current process of defining roles, often referred to as role engineering, is often based on a manual analysis of how an organization operates, and attempts to map that organizational structure to the organization's IT infrastructure. This process can require a substantial amount of time and resources, both for the analysis and implementation.

BRIEF DESCRIPTION OF THE DRAWINGS

Embodiments of the present invention are illustrated by way of example and only with reference to the figures of the accompanying drawings, in which like references indicate similar elements and in which.

Other features of the present embodiments will be apparent from the accompanying drawings and from the detailed description that follows.

DETAILED DESCRIPTION OF EMBODIMENTS OF THE INVENTION

A method of creating roles in an enterprise system is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
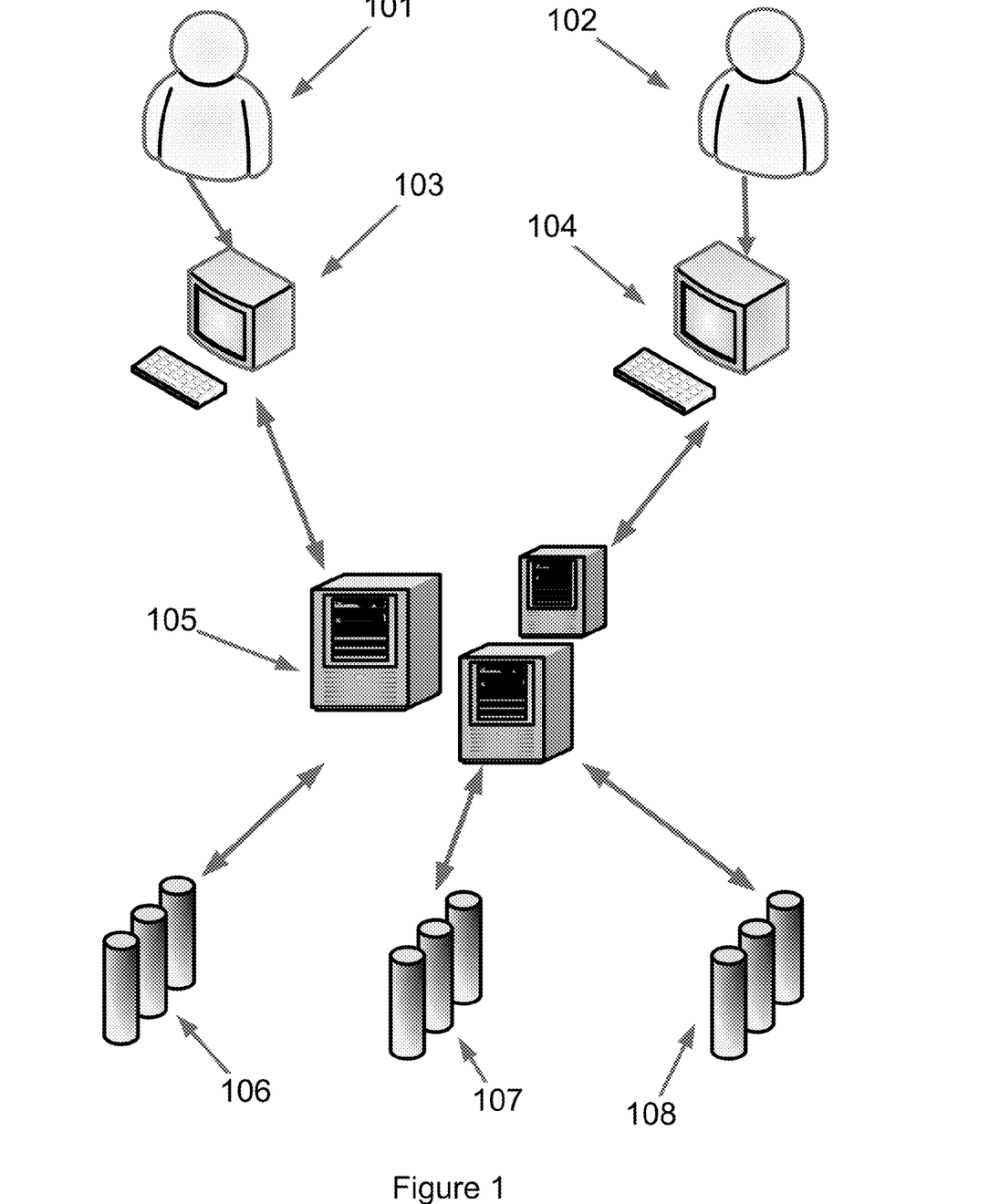
FIG. 1 is a diagram showing an example of an environment in which the present invention may be implemented.

FIG. 1 illustrates an example of a computing environment in an enterprise. The enterprise may include companies, administrative bodies, defense organizations etc. Typically the computing environment in an enterprise may comprise a server system 105 and a plurality of storage units 106-108 connected to server system 105 to store the enterprise data. The computing environment may also comprise a plurality of client computers 103, 104 connected to the server system 105. The client computers 103 and 104 in an enterprise are used by the employees and/or authorized users 101, 102 to access the server system 105 to carry out their computational jobs. The server system 105, client computers 103, 104 and storage units 106-108 are connected to each other via a communication network such as local area network, wide area network, wireless network or the like. Although the server computer and the client computers are shown as differently in the drawings, a person skilled in the art, however, understands that the concepts of client and server are primarily are the software functions are independent of the underlying hardware being used. In other words a computer which is primarily designed for use as a client, may also in some cases function as a server. Similarly a computer that is primarily design for use as a server, may also in some cases function as a client.

The server system 105 may be a personal computer, a server, a router, a network PC, a workstation, a microprocessor based appliance, a peer device or other common network node for instance. The client computers 103, 104 may be a personal computer, a server, a router, a network PC, a workstation, a microprocessor based appliance, a peer device or other common network node for instance. The communication network 105 may comprise a local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL). The client computers 103, 104 and/or the server system 105 may include a processing unit, a system memory, and a system bus. The system bus couples the system components including, but not limited to, the system memory to the processing unit. The processing unit can be any of various available processors.

In an enterprise system, generally the activities of users are recorded in system log files. A system log file is automatically created and maintained by the server system to record activities performed by it. The system log file has a structure which is specific to the operating system being used on the system. For example in an UNIX based enterprise system the activities are recorded in an utmp structures in the system log files. The information recorded in the system log file may contain information like user name, terminal information, time information, and the like. The system log file may also contain other information, apart from those listed above. The user name may consist of an actual administrator name and/or the user identification also known as userid. The terminal information may comprise the identification number of the terminal device which the user is associated with. The time information may comprise the time when the user logged in the system, the time spent by the user on the system and the time when user logged out of the system.

In an enterprise system a switch user (SU) functionality allows a user to become a super user after providing an administrator password. Normally the administrator password is shared with a person employed to maintain and operate the enterprise computing system and/or network. This person may be referred to as a system administrator. The system administrator is usually charged with installing, supporting, and maintaining servers or other computer systems, and planning for and responding to service outages and other problems. The system administrator may include database administrator, network administrator, security administrator and web administrator for instance. There may be more than one system administrator in an enterprise. The switch may happen when a system administrator was logged on the system with his personal id that is a userid and later switch to system administrator id by entering the system administrator password. When a user switches from being a normal user into a super user, the information is recorded on a log file. In case of HP-UX operating system the switch information from normal user to super user is recorded on the /var/adm/sulog file. The information recorded on the SU file may comprise the time information when a particular user has become a super user, the user id from which the particular user has become a super user, the amount of time spent by the user in the super user mode, and the terminal from which the user has switch to the super user, for instance. As an example when a user John changes from normal user to a super user the following information may be recorded on the SU file.

SU 08/06 10:00+ttyp1 john-root

Figure 2:
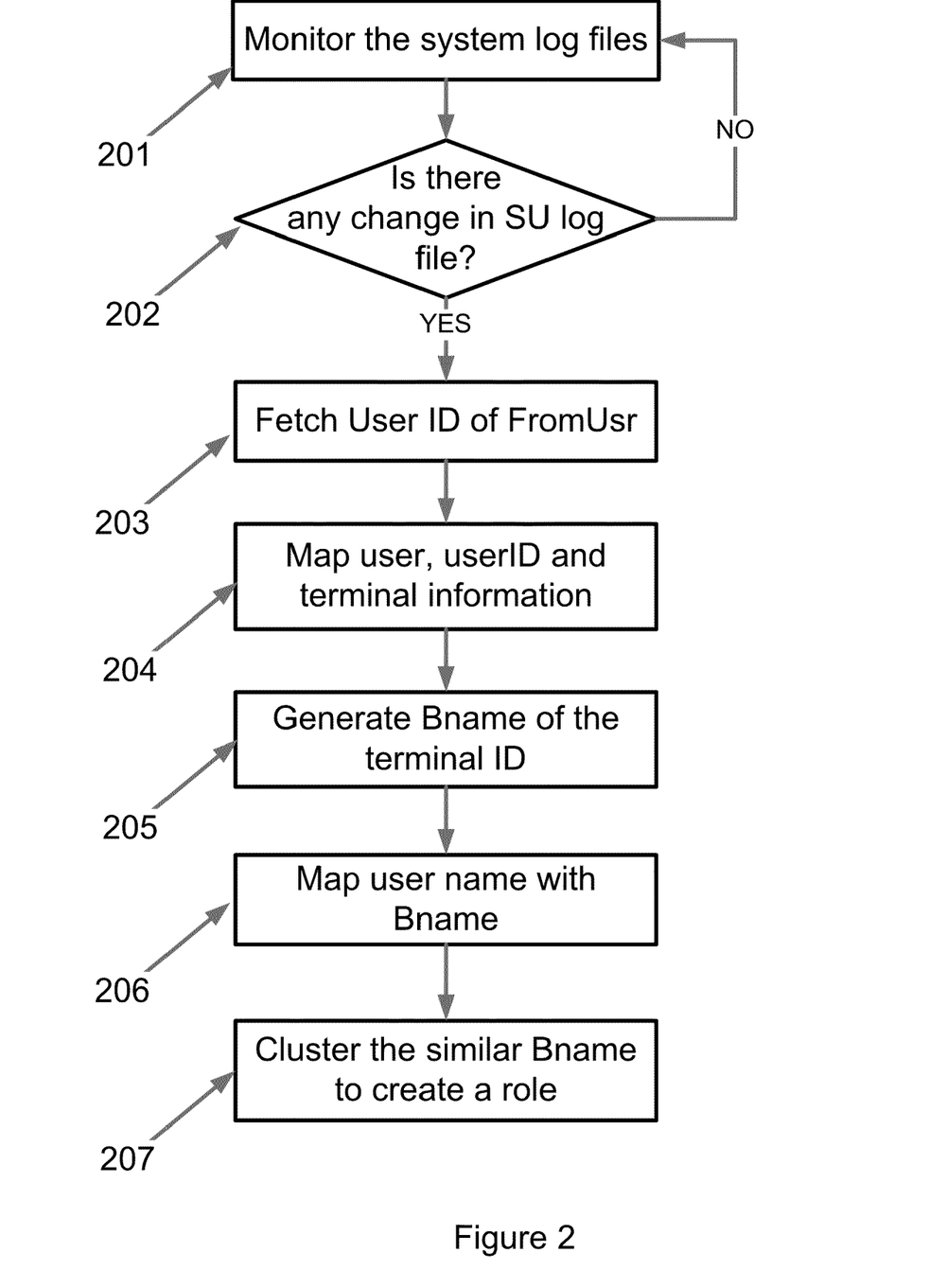
FIG. 2 is a diagram showing steps of an algorithm for creating a role in one example embodiment of the invention.
Figure 3:
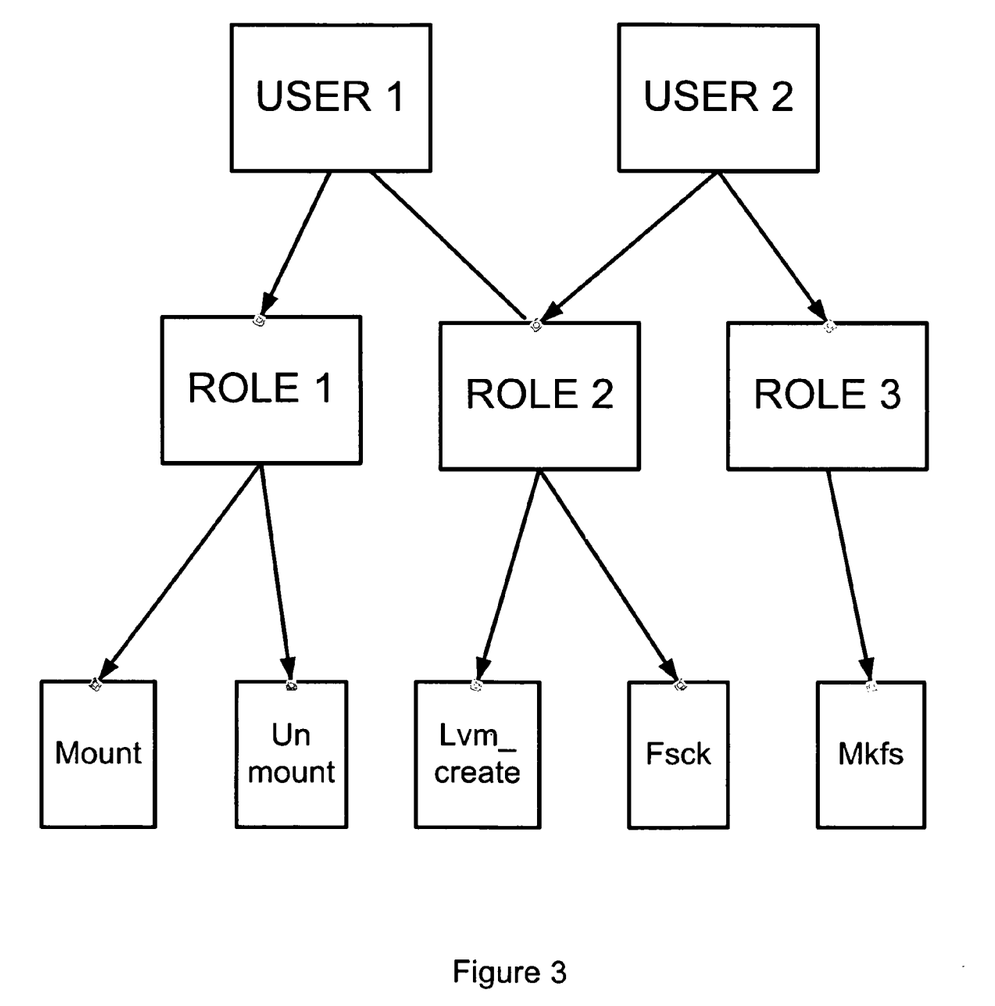
FIG. 3 is a diagram showing an example of the roles created in one example embodiment of the invention.

In one example embodiment the log files of an enterprise system are monitored to determine roles for the enterprise system. FIG. 2 illustrates steps involved in an algorithm for finding roles in an enterprise. This algorithm will also be referred to as role finder algorithm (RFA) 200 in the following description. The RFA 200 may map the users of an enterprise to the resources being used by the users to create a role. The term role, as used herein, refers to a virtual container that comprises access rights, privileges and/or attributes that, once a user gets authorized for the role, allows access to the enterprise system resources, data and transaction authorizations needed for the job or function(s) that the user performs. As mentioned above a well known application for a role based control system is Role Based Access Control (RBAC), a security application that restricts and manages user access to enterprise resources. While the present invention is described herein as applied to a RAC system, the invention is not so limited. In general, the role discovery process of the present invention may be advantageously applied to any role based control system. The RFA will be described in detail in the following part of the description.

At step 201 of the FIG. 2, the RFA may continuously monitor and/or scan the log files of the enterprise system to detect the instances of a super user login. In case of HP-UX operating system and/or UNIX operating system the RFA may monitor /var/adm/sulog file of the enterprise system. If there is a change in the log file such as when a normal user logs as a super user, the RFA may convert the log files into a new string format represented as "SU Date Time+Terminal FromUsr_-_ToUsr. The new string format FromUsr represents the user ID through which a user has logged into the enterprise system and ToUsr represents the administrator or root user. The Time in the above format may represent the exact time when the user changed from a normal user to the super user and the amount of time user spent in the super user mode. If there is any change in the /var/adm/sulog file then the RFA may fetch the Terminal details and FromUsr details from the log file. The FromUsr details may be fetched from the operating system environment user and accounting information file, also referred as utmp/btmp file in a Unix Environment. In an alternative embodiment the RFA may monitor and/or scan the log files for identifying changes at a predetermined time interval. The time interval may be determined by the system administrator.

Continuing to step 203 of FIG. 2 the RFA may fetch the user ID (UID) of the above identified FromUser from the log files of the operating system. The log files are preferably stored in the data storage unit 106-108 connected to the server system 105 in form of a database for the security reasons. Depending on the enterprise policy, log files may be stored on variety of data storage medium. Preferably, the data base is stored on a hard disk coupled to the system. In another preferred embodiment of the present invention, the data base is stored in the RAM of a computer. The data storage unit 106-108 may also contain security data. The relevant existing security data may at least comprise the status quo of the existing access rights of each IT-User of the enterprise; i.e. access to computers, networks, databases hardware, software and/or transaction authorizations. Preferably, the security data additionally comprises: organizational data for example the position of a person in the enterprise; i.e. the company, the division and/or the location the person works and/or functional data for example in which projects a certain person is involved and/or job descriptions.

At step 204 of FIG. 2 the RFA may create a mapping between a user, the user id of the user and a client computer also referred as a terminal on which the user is logged. The mapping information between the userID and the terminal may be retrieved from the log files and/or the auditing environment of the operating system. The auditing environment of an operating system has an ability to log the information like user ID, terminal ID, process and/or parent process ID for instance. An example of a mapping for an enterprise with two users John and Lewis is depicted in Table 1. Two users John and Lewis with user ID 100 and 200 logged on the server system through terminals Ta and Tb respectively.

TABLE 1

| User | User ID (uid) | Terminal Information |
|------|---------------|----------------------|
| John | 100 | Ta, ttyp1 |
| Lewis | 200 | Tb |

Continuing to step 205 of FIG. 2, the RFA may scan the log file for the terminal identified in step 204. The RFA by scanning the log files may list the operations or commands executed from the terminal. More specifically the RFA may list the commands executed from the terminal during the time the user was logged in as super user. The log file of the operating system has an ability to log information such as the terminal ID from which a particular command had executed and an inode of the command being executed by a user. The inode stores information on files such as user and group ownership, the access mode that is—read, write, execute permissions—and type of file. If there is a match, the RFA may fetch the corresponding inode and generate the absolute pathname of inode. The complete pathname of a command and/or operation is also referred as the binary name or Bname in this description. The RFA may derive the command and/or operation which that session has executed and match it with above user name using time and terminal information.

Further continuing at step 205 of FIG. 2, the RFA may use the information from step 204 to create and/or update the mapping between the terminal and the Bname. The mapping between the terminal and the Bname may provide the exact commands executed from the terminal where the user logged as super user. Table 2 illustrates an example of mapping between the terminal information with the Bname as first and second column.

TABLE 2

| Terminal information | Bname |
|---|---|
| Ta, ttyp1 | /sbin/mount |
| Tb | /sbin/mount |

At step 206 of FIG. 2, the RFA by using the mapping between the terminal and user name and the mapping between terminal and Bname may map the username with the Bname. The mapping between the users and the Bname may provide with the exact commands executed by the users. The RFA for instance may create and/or update a table for a mapping between the username and the Bname. As an example the RFA may for every entry of third column in Table 1, find entry in column 1 of Table 2, thereby creating and/or updating a table 3, where user name and Bname in the first and the second column respectively.

TABLE 3

| User | Bname |
|---|---|
| John | /sbin/mount |
| Lewis | /sbin/mount |

The RFA for an enterprise may map the username and the commands and/or operations executed by the user after switch user operation over a period of time. As an example Table 4 illustrates a mapping between the users and command executed by the users, when user John and Lewis execute super user commands, after performing switch user operation.

TABLE 4

| User | Bname |
|---|---|
| John | /sbin/mount |
| John | /sbin/unmount |
| John | /sbin/fsck |

TABLE 4-continued

| User | Bname |
|---|---|
| Lewis | /sbin/mkfs |
| Lewis | /sbin/mount |
| Lewis | /sbin/unmount |
| John | /sbin/lvmcreate |

At step 207 of FIG. 2, the RFA by using the mapping between the users and the commands executed by the users may create a plurality of roles by clustering and/or grouping the similar commands. In particular, roles pertinent to a Role Based Access Control system are generated by clustering bnames according to entitlements associated with the bnames. The clustering can be made a completely automated process, proceeding according to rules, heuristics, and algorithmic constraints selected or programmed into the clustering software. As an example, table 5 illustrates the different roles created corresponding to mapping of table 4.

TABLE 5

| User | Role name | Command |
|---|---|---|
| John, Lewis | Role 1 | Mount, unmount |
| John | Role 2 | lvm_create, fsck |
| Lewis | Role 3 | Mkfs |

There has been described a method of creating roles comprises monitoring a system for instances of a change from a first normal user to a first super user; mapping the first user with a terminal; scanning the system to derive a plurality of commands executed from the terminal; mapping at least one of the plurality of command executed from the terminal to the first super user; and creating a first role comprising an authorization to execute the at least one command executed by the first super user.

In some embodiments the method of creating roles comprises mapping a plurality of command executed from the terminal to the first super user; grouping the plurality of commands executed by the first super user into at least one subgroup of commands; and assigning an authorization to execute the subgroup of commands to said first role.

In some embodiments the method of creating role in an enterprise comprises monitoring the system for instances of a change from a second normal user to a second super user; mapping the second super user with a terminal; scanning the system to derive a plurality of commands executed from the terminal; mapping at least one of the plurality of command executed from the terminal to the second super user; and creating a second role comprising an authorization to execute the at least one command executed by both the first super user and the second super user.

The information about the exact commands executed by the user may be used by an intelligent clustering and/or grouping method to cluster the similar commands to form a role. Accordingly the users may be assigned with a role thereby delegating the authorization of the system resources. A variety of intelligent clustering or grouping procedures are known in the art, such as for example, through the use of proximity algorithms of various types. In some embodiments, the roles generated by the clustering may be reviewed by one or more users, an administrator of the enterprise system, for instance. These users may inspect the generated roles, and may specify changes. For instance, if desired, the user may add, delete, modify, join or split the generated roles based on their experience. For example, the user may combine or aggregate roles to create more general-purpose roles. Alternatively, the users may restrict certain identities or classes of identities from a recommended role, perhaps generating a new role to contain the selected identities. Additionally, the users may alter the weighting of various attributes, causing different roles to be generated during the clustering step. In general, a wide variety of editing functions may be performed on the recommended roles. As a result of this user feedback the recommended roles may be re-executed generating a new set of recommended roles. This process may be repeated as necessary or desired. When the user is satisfied with the recommended roles, the user may approve the role at which point they may be implemented into the desired system.

According to an embodiment the existing rights of the users in the enterprise system are annulled and newly created roles are assigned. After the implementation of the newly created roles, the authorizations of the users remain unchanged, that is every user still has the same authorizations to enterprise system resources as before. It is however possible that for the sake of a consistent security system the access rights of one or more users are either increased and/or reduced. The present technique has an advantage that the roles may be created automatically, based on the security data. Yet another advantage of the present technique is the capability of learning and suggesting new roles to the security officers on a continuous basis. Any unauthorized access rights that exist in the enterprise system may be discovered and a consistent policy regarding access rights to the server system, client systems, networks databases etc. can be realized. The created roles can be stored in the database where rest of the enterprise information resides.

Although the RFA is described with reference to the Unix system more specifically to the HP-UX systems, the RFA may also create roles from different systems such as Apple Macintosh systems or Microsoft Windows systems for instance. The system log files from different operating systems may be converted into the desirable format using commonly available tools. Most operating systems implement similar distinctions among users regarding permissions and access. For example a user with "root" login on Unix system may be equated to an user having "administrator" status in a Windows NT system.

Figure 4:
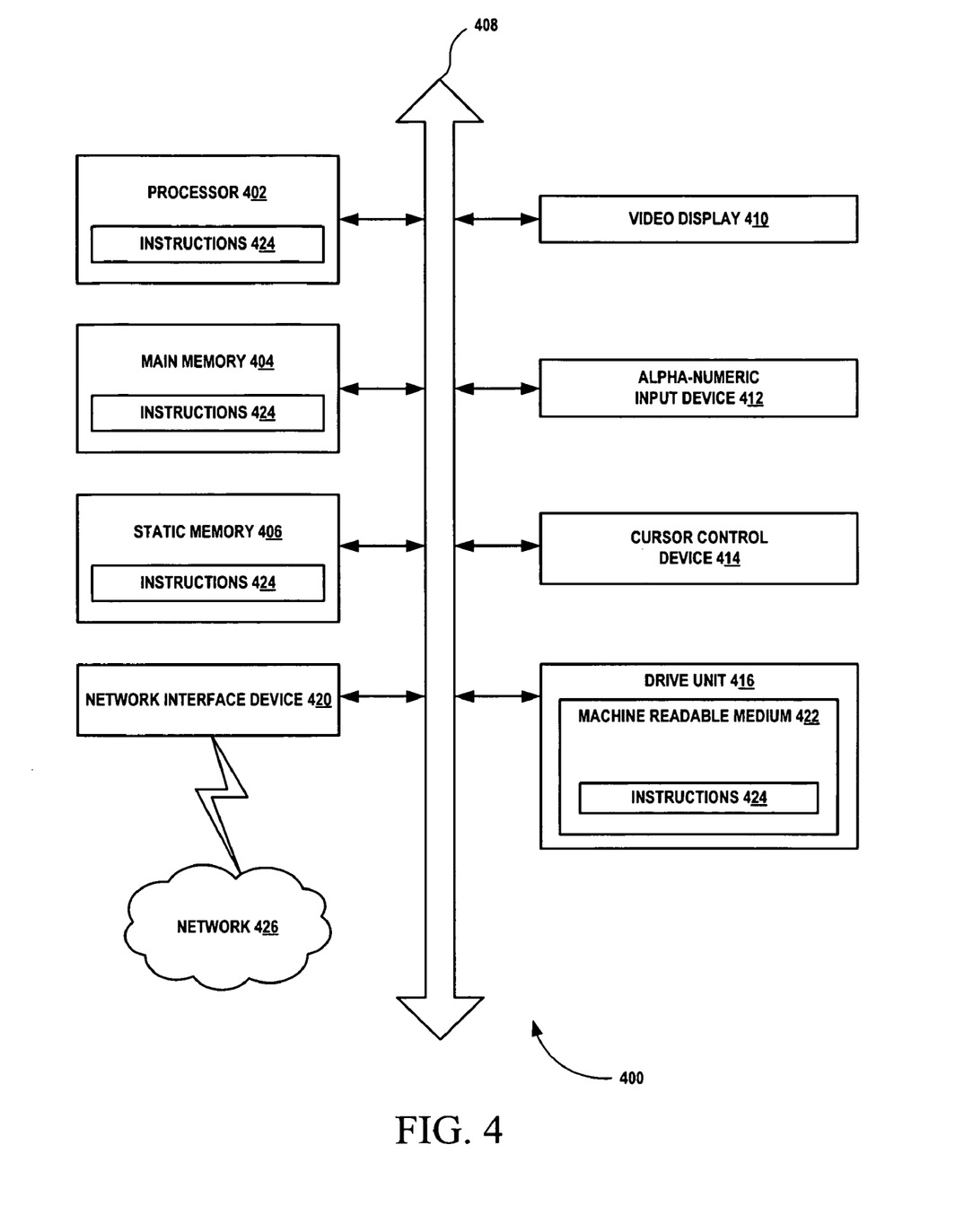
FIG. 4 is a diagrammatic system view of a data processing system in which any of the embodiments disclosed herein may be performed, according to one embodiment.

FIG. 4 is a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a network interface device 420, a machine readable medium 422, instructions 424 and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory device associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

The invention claimed is:

1. A method of creating roles comprising:
    monitoring a system for a change of a login mode of a user from a first normal user mode to a first super user mode;
    mapping an identifier of said user with a terminal after the login mode of said user has changed to the first super user mode;
    scanning said system to derive a plurality of commands executed from said terminal while said user is in the first super user mode;
    mapping at least one of the plurality of commands executed from said terminal to said user in the first super user mode; and
    creating a first role comprising an authorization to execute the at least one command executed from said terminal while said user is in the first super user mode.

2. The method of claim 1 further comprising:
    mapping the plurality of commands executed from said terminal to said user in the first super user mode;
    grouping the plurality of commands executed from said terminal while said user is in the first super user mode, into at least one subgroup of commands; and
    assigning an authorization to execute said subgroup of commands to said first role.

3. The method of claim 1 further comprising:
    monitoring the system for a change of a login mode of a second user from a second normal user mode to a second super user mode;

mapping an identifier of said second user with a second terminal after the login mode of said second user has changed to the second super user mode;

scanning said system to derive a plurality of commands executed from said second terminal while said second user is in the second super user mode;

mapping at least one of the plurality of commands executed from said second terminal to said second user in the second super user mode; and wherein creating said first role is further based on the at least one command executed from said second terminal while said second user is in the second super user mode.

4. The method of claim 1 wherein monitoring the system for the change comprises monitoring a system log file.

5. The method of claim 4 wherein monitoring said system log file comprises monitoring a /var/adm/sulog file in a UNIX system.

6. The method of claim 1 further comprising incorporating said first role in a role based access control system.

7. The method of claim 1 further comprising assigning at least one normal user to said first role.

8. The method of claim 1 wherein the authorization to execute said command includes a permission to execute said command, and resources required to execute said command.

9. A computer program product for creating roles in an enterprise system, the computer program product comprising a non-transitory storage medium readable by a processing circuit and storing instructions for execution by the processing circuit for performing:

monitoring a system for a change of a login mode of a user from a first normal user mode to a first super user mode;

mapping an identifier of said user with a terminal after the login mode of said user has changed to the first super user mode;

scanning said system to derive a plurality of commands executed from said terminal while said user is in the first super user mode;

mapping at least one of the plurality of commands executed from said terminal to said user in the first super user mode; and creating a first role comprising an authorization to execute the at least one command executed from said terminal while said user is in the first super user mode.

10. The computer program product of 9 wherein the instructions are for execution by the processing circuit to further perform:

mapping the plurality of commands executed from said terminal to said user in the first super user mode;

grouping the plurality of commands executed from said terminal while said user is in the first super user mode, into at least one subgroup of commands;

assigning an authorization to execute said subgroup of commands to said first role.

11. The computer program product of claim 10 wherein the instructions are for execution by the processing circuit to further perform:

monitoring the system for a change of a login mode of a second user from a second normal user mode to a second super user mode;

mapping an identifier of said second user with a second terminal after the login mode of said second user has changed to the second super user mode;

scanning said system to derive a plurality of commands executed from said second terminal while said second user is in the second super user mode;

mapping at least one of the plurality of command executed from said second terminal while said second user is in the second super user mode; and wherein creating said first role is further based on the at least one command executed by said second terminal while said second user is in the second super user mode.

12. The computer program product of claim 9 wherein monitoring the system for the change comprises monitoring a system log file.

13. The computer program product of claim 12 wherein monitoring said system log file comprises monitoring a /var/adm/sulog file in a UNIX system.

14. The computer program product of claim 9 wherein the instructions are for execution by the processing circuit to further perform incorporating said first role in a role based access control system.

15. The computer program product of claim 9 wherein the authorization to execute said command includes a permission to execute said command, and resources required to execute said command.

* * * * *

UNITED STATES PATENT AND TRADEMARK OFFICE
CERTIFICATE OF CORRECTION

| | | |
|---|---|---|
| PATENT NO. | : 8,312,515 B2 | Page 1 of 1 |
| APPLICATION NO. | : 12/334548 | |
| DATED | : November 13, 2012 | |
| INVENTOR(S) | : Kiran Kumar Satya Srinivasa Ratnala et al. | |

It is certified that error appears in the above-identified patent and that said Letters Patent is hereby corrected as shown below:

In the Claims

In column 10, line 1, in Claim 10, after "of" insert -- claim --.

Signed and Sealed this
Twenty-second Day of October, 2013

Teresa Stanek Rea
*Deputy Director of the United States Patent and Trademark Office*